United States Patent [19]

Rouffet

[11] 4,389,727
[45] Jun. 21, 1983

[54] METHOD FOR CONTROLLING THE CLOCK PHASE OF A RECEIVING SYSTEM FOR DIGITAL DATA, PHASE RECOVERY CIRCUIT FOR EFFECTUATING THIS METHOD AND DIGITAL DATA RECEIVING SYSTEM COMPRISING SAID CIRCUIT

[75] Inventor: Denis Rouffet, Paris, France

[73] Assignee: U.S. Philips Corporation, New York, N.Y.

[21] Appl. No.: 236,942

[22] Filed: Feb. 23, 1981

[30] Foreign Application Priority Data

Feb. 27, 1980 [FR] France ................................ 80 04324

[51] Int. Cl.³ .......................................... H04L 7/04
[52] U.S. Cl. ................................ 375/110; 375/14; 375/118; 328/155
[58] Field of Search ..................... 364/178, 179, 724; 333/17 R, 18; 328/72, 155, 162; 375/12, 14, 103, 104, 118, 119, 76, 110, 97

[56] References Cited

U.S. PATENT DOCUMENTS

| 4,035,625 | 7/1977 | Chiu et al. | 364/724 |
| 4,146,840 | 3/1979 | McRae et al. | 333/18 |
| 4,228,409 | 10/1980 | Wouda et al. | 333/18 |
| 4,251,777 | 2/1981 | Sartorius et al. | 328/155 |

*Primary Examiner*—Benedict V. Safourek
*Attorney, Agent, or Firm*—Thomas A. Briody; William J. Streeter; Edward W. Goodman

[57] ABSTRACT

Method for controlling the phase of a decision circuit clock of a receiving system for digital data, according to which the frequencies above 1/T (T=data symbol period) are substantially eliminated, whereafter the phase deviation to be corrected is evaluated and the clock is shifted in accordance with this phase deviation, inclusive of its sign. An example of a circuit for using this method includes a lowpass filter circuit and an evaluation and phase shifting circuit for fixing the optimum decision instants of the decision circuit provided at the output of an adaptive filter.

5 Claims, 5 Drawing Figures

METHOD FOR CONTROLLING THE CLOCK PHASE OF A RECEIVING SYSTEM FOR DIGITAL DATA, PHASE RECOVERY CIRCUIT FOR EFFECTUATING THIS METHOD AND DIGITAL DATA RECEIVING SYSTEM COMPRISING SAID CIRCUIT

BACKGROUND OF THE INVENTION

The present invention relates to receiving systems for digital data which are transmitted after linear modulation over a time-varying channel with limited passband. Such a channel introduces distortions of its output signal relative to its input signal constituted by the data sequence transmitted with a symbol period T.

Generally, such receiving systems are predominantly comprised of a filter circuit for the output signal of the channel and a subsequent decision circuit for estimating and recovering each of the transmitted digital signals at the input of the channel on the basis of the output signal of the filter circuit. These estimations must occur in the rhythm of a clock whose frequency and phase are produced by a clock recovery circuit permitting a decision which minimizes the error rate.

This problem of synchronization by means of clock frequency and phase recovery is of very great importance for the quality of the transmission of the data. To ensure that the receiving system restitutes the transmitted information at the input of the channel as correctly as possible, it be indispensable that this system is capable of detecting the most significant instants of the output signal of the channel; nowadays this possibility is obtained by means of the above-mentioned recovered clock, a control of which at the receiving end enables a synchronization with the clock of the transmitter. However, the systems realized thus operate poorly when the transfer function of the channel varies with time.

Based on said last assumption, British Patent Specification No. 1,478,709 discloses a receiving system for data which, in the example considered, are transmitted by differential multiphase modulation. By means of correlation, starting from the line signal and the detected information, this system generates a signal representing the envelope of the signal elements used for transmission or, as a variant, the square of this envelope. In this Example the line signal is expressed by the relation:

$$r(t) = \sum_k \rho_k S_1(t - kT)\cos\phi_k + S_2(t - kT)\sin\phi_k \quad (1)$$

where $S_1(t)$ is the signal usually designated as elementary signal and resulting from the modulation of a carrier $\omega_c$ by the baseband signal $g(t)$, so:

$S_1(t) = g(t) \cos \omega_c t$;

$S_2(t)$ is the signal in quadrature-phase with $S_1(t)$, so:

$S_2(t) = g(t) \sin \omega_c t$;

and where $\rho_k$ and $\phi_k$ are the discrete amplitude and phase values used to represent the data at the instants $kT$ (where T is the symbol period of the data), said values having been taken from the set of the discrete values $\{\rho_j\}$ and $\{\phi_j\}$ used for transmission (the expression (1) indicates that the signal results from the superposition of a large number of signals corresponding to sequentially transmitted information elements, and thus expresses the penomenon known as intersymbol interferences). The envelope signal of the transmitted elementary signal is then defined by the expression:

$$R(t) = \sqrt{S_1^2(t) + S_2^2(t)} \quad (2)$$

On the curve representative of the shape of the envelope signal thus defined, two (or more) points are defined at mutually equal distances from a predetermined time reference point and the information for controlling the clock on reception consists of the amplitude deviation between these two points of the curves (or in the event of more than two points, by the deviation in the position of the centre of gravity of these points relative to a reference position). The experiments and simulations performed show that the reception of the transmitted data seems optimum when this deviation becomes zero.

The system described in said British Patent Specification No. 1,478,709 has, however, very serious drawbacks. On the one hand, the principle adopted for cancelling the phase deviation permits of an accidental synchronization of the clock at an extremum of the curve (and not only at a maximum), which does not result in the desired optimalization. On the other hand, the system operates with the aid of feedback loops comprising adaptive equalizers and converges comparatively slowly. A further known fact is that the greatest disadvantage of such adaptive systems is, in general, their complicated character so that these systems are very difficult to employ at very high transmission rates. Finally, it should be noted that the absence of filtering at the output of the transmission channel is no guarantee that the proposed principle can be used, as the presence of real maximum is not certain.

SUMMARY OF THE INVENTION

An essential object of the invention is to provide a method and a phase recovering circuit which have the advantage of a short response time and a simpler structure than the prior art realizations.

According to the invention, the method for controlling the phase of the clock of the decision circuit in a digital data receiving system as defined in the foregoing, is characterized in that this method comprises the following steps:

imposing on the filter circuit a transfer function such that this circuit substantially eliminates the frequencies above 1/T from the received frequency spectrum and the average energy E of its output signal as a function of the time t and of the symbol period T of the transmitted data at the input of the channel is only defined by an expression of the type $E = A + B \cos(2\pi t/T)$, A and B being two constant, or slowly varying, positive real coefficients;

estimating the phase deviation $\phi_E$ between the value $\phi_M = 2\pi t_M/T$ maximizing the expression for E and the value $\phi = 2\pi t/T$ corresponding to the value of the average energy of the output signal of the filter circuit at a sampling instant t preceding the clock phase control; and shifting the decision instants fixed by the clock over a time $t_E = (\phi - \phi_M)T/(2\pi)$, taking its sign into consideration.

A rapid mathematical analysis which will be described in greater detail hereinafter, results in a special choice of the filter conditions and hence in an extremely simple determination of the phase deviation by the solving of a system of trigonometrical equations.

The phase recovering circuit for carrying the above-described method into effect consequently comprises a lowpass filter circuit for carrying out the first step of this method, and an evaluation and phase shifting circuit for carrying out the second and third steps.

Two basic embodiments are possible for the evaluation and phase shifting circuit, depending on whether the digital transmission is effected slowly or rapidly.

In the first case, the evaluation and phase shifting circuit in accordance with the invention is characterized in that this circuit comprises:

a squaring circuit receiving the output signal of the lowpass filter circuit;

first, second, third and fourth parallel-arranged sampling circuits, each receiving the output signal of the squaring circuit and having their sampling instants spaced by T/4;

first and second summing circuits receiving at respective first, positive inputs thereof the respective output signals of the first and the second sampling circuits and at respective second, negative inputs thereof the respective output signals of the third and fourth sampling circuits;

first and second multipliers receiving respectively at first inputs thereof the output signals of the first and the second summing circuits, each through a respective series arrangement of an integrator and an amplifier;

a local oscillator which fixes the sampling instant of the first sampling circuit and, by means of a 90° phase shifter, the sampling instant of the second sampling circuit, these oscillator and phase shifter output signals also being applied to the second inputs of the second and the first multipliers, respectively, and being further applied to the first and the fourth sampling circuits, respectively, through two inverter circuits; and an adder receiving the output signals of the first and the second multipliers, the output signal of this adder being applied as the clock to the decision circuit.

In the second case, where a digital transmission is effected rapidly, the implementation of the sampling circuit becomes increasingly more critical and a delay line structure is preferred to the above-mentioned solution. The evaluation and phase shifting circuit of the invention is then characterized in that this circuit comprises:

a squaring circuit receiving the output signal of the lowpass filter circuit;

a first summing circuit receiving at a first, positive input the output signal of the squaring circuit and at a second, negative input the same output signal through a delay line having a time delay equal to T/2, and a second summing circuit receiving at a first, positive input the output signal of the squaring circuit through a delay line having a time delay equal to T/4 and at a second, negative input the same output signal through a delay line having a time delay equal to 3T/4;

first and second multipliers receiving at respective first inputs thereof the output signals of the first and the second summing circuits, each through a respective series arrangement of a sampling circuit and an integrator, the sampling instants of the first and the second sampling circuits being spaced by T/2;

a local oscillator which fixes the sampling instant of the first sampling circuit and, by means of an inverter circuit, the sampling instant of the second sampling circuit;

a 90° phase shifter for receiving the output signal of the oscillator, the output signal of the 90° phase shifter and the output signal of the oscillator, applied to the first sampling circuit, being applied to the second inputs of the first and the second multipliers, respectively;

an adder receiving the output signals of the first and the second multipliers, the output signal of this adder being applied as the clock to the decision circuit.

In the two possible embodiments described in the foregoing, a proper choice of the samples of the filter circuit output signal, their combination and their processing for progressively determining, on the basis of the knowledge of the average energy of the signal, the value of the angle $\phi$ expressing the phase deviation to be eliminated, permits the effectuation of the desired control by means of a circuit which remains very simple, is independent of the circuit provided for recovering the clock frequency and has an excellent convergence.

DESCRIPTION OF THE DRAWINGS

Embodiments of the circuits in accordance with the invention and their advantages will now be further explained by way of non-limitative example with reference to the accompanying drawings. Herein

DESCRIPTION OF THE PREFERRED
EMBODIMENTS

Figure 1:
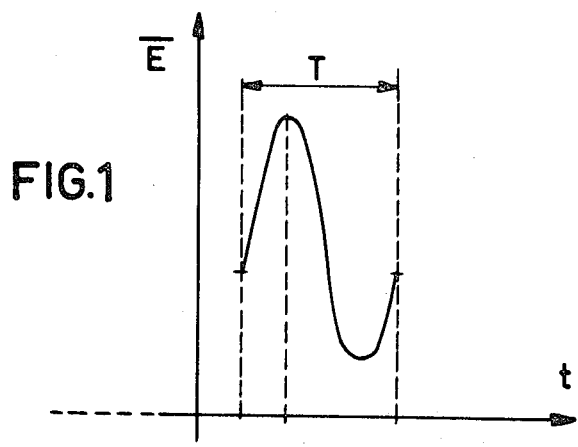
FIG. 1 is a curve showing the variation of the average energy of the output signal of a transmission channel during the symbol period T.

It is known that in the field of digital data transmission, the use of filters can only very seldomly be avoided. In fact, the curve of FIG. 1 shows that the average energy of the output signal of a transmission channel is at its maximum at uniformly distributed sampling instants spaced by a duration T equal to the symbol period of the transmitted digital data, but diminishes very rapidly on either side of these instants. For the quality of the reception of these data, it is very important to maximize the signal-to-noise ratio at the sampling instants and thus a filter stage is provided at the output of the channel to modify these curves of the received energy so that searching for the optimum sampling instants is realisable.

The expression for the average energy of the channel output signal can be found by introducing the following notations:

T=period of the digital data (i.e. the duration of one data symbol);
$I_k$=the transmitted symbol;
$P_I$=the average energy of $I_K$;
$h(t)$=impulse response of the transmission channel;
$h^*(t)$=complex conjugate of the impulse response;
$\tau$=sampling instant
$\chi_k$=received data;

$E(\cdot)$ = the average value (mathematical expectation of the expression between brackets.

The received data sequence is given by the following expression:

$$X_k(\tau) = \sum_p [h(\tau + pT) \cdot I_{k-p}] \quad (1)$$

from which the expression for the average energy $E_\tau$ of the signal at each instant $\tau+kT$, irrespective of the value of k, can be derived:

$$E_\tau = E\{X_k^2(\tau)\}/P_I = \sum_p [h(\tau + pT)h^*(\tau + pT)] \quad (2)$$

The expansion of E into a Fourier series results in ($\int$ = integral):

$$E_\tau = \sum_{p=0}^{p=\infty} E_p \cdot \exp(-i\, 2\pi p\tau/T) \quad (3)$$

and $$E_p = (1/T) \int_0^T E_\tau \cdot \exp(i\, 2\pi p\tau/T) d\tau \quad (4)$$

The expression (4) becomes:

$$E_p = (1/T) \int_0^T \sum_{j=0}^{j=\infty} h^*(jT + \tau) \cdot h(jT + \tau) \cdot \exp(-i\, 2\pi p\tau/T) d\tau$$

or:

$$E_p = (1/T) \sum_{j=0}^{j=\infty} \int_{jT}^{(j+1)T} \exp(-i\, 2\pi p\tau/T) \cdot h^*(jT + \tau) \cdot h(jT + \tau) d\tau \quad (5)$$

which, after substituting u for (jT+$\tau$), results in:

$$E_p = (1/T) \sum_{j=0}^{j=\infty} \int_{jT}^{(j+1)T} \exp(-i\, 2\pi pu/T) \cdot h^*(u) \cdot h(u) du$$

or:

$$E_p = (1/T) \int_{-\infty}^{\infty} h^*(u) \cdot h(u) \cdot \exp(-i\, 2\pi pu/T) du \quad (6)$$

from which it follows that:

$$E_p = (1/T) |H(\omega)^* H^*(\omega)| \quad \omega = 2\pi p/T. \quad (7)$$

In said last expression $H(\omega)$ represents the Fourier transform of h(u) and the asterisk corresponds to the convolution operator. As the passband of the transmission channel is limited, the expression (u) for the average received energy likewise contains only a limited number of terms in the Fourier series which describes this energy. By limiting the number of these terms to two by means of a lowpass filter eliminating or rendering negligible the frequencies in the received spectrum higher than 1/T, and by assuming (for the sake of simplicity and without any limitation to the invention) that the phase of the optimum sampling instant is 0, $2\pi$, $4\pi$, ..., the average energy E received at the output of the lowpass filter varies as a function of the position $\tau$ of the sampling instants in accordance with the following expression:

$$E_\tau = A + B \cos(2\pi\tau/T) \quad (8)$$

where A and B are two constant positive real coefficients or, as the case may be, positive real coefficients which vary slowly with time. In accordance with the above computations the received average energy is therefore of a sinusoidal shape.

The expression (8) may of course also be written in the following way:

$$E_\tau = A + B \cos \phi \quad (9)$$

where $\phi$ represents the phase deviation between the optimum sampling instant (so that the received energy is at its maximum) and the real sampling instant of the clock of the receiving system prior to control of this clock in accordance with the invention. So the method for carrying this control into effect comprises the following three main steps:

providing at the output of the channel a low-pass filter which eliminates, or renders negligibly small, the frequencies of the received frequency spectrum above 1/T in order to give the average energy at the output of this filter an expression of the type defined by the relations (8) or (9);

connecting to this lowpass filter an evaluation circuit for the value of the phase deviation $\phi$ appearing in the relation (9);

connecting to this evaluation circuit a phase shifting circuit which carries out the desired clock phase control in accordance with said value $\phi$.

Figure 2:
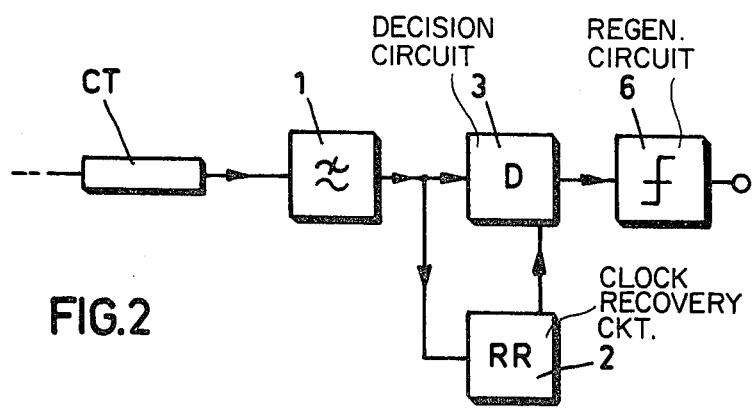
FIG. 2 and FIG. 3 show very schmeatically two receiving systems, one (FIG. 2) being of a non-adaptive structure and the other one (FIG. 3) being of an adaptive structure (adaptive structure must be understood to mean a system generating an error signal, which is a function of the difference between the correct or the extimated formm of the digital data at their transmission and the form these data will have at the output of the adaptive system, and reducing this error to a minimum)
Figure 3:
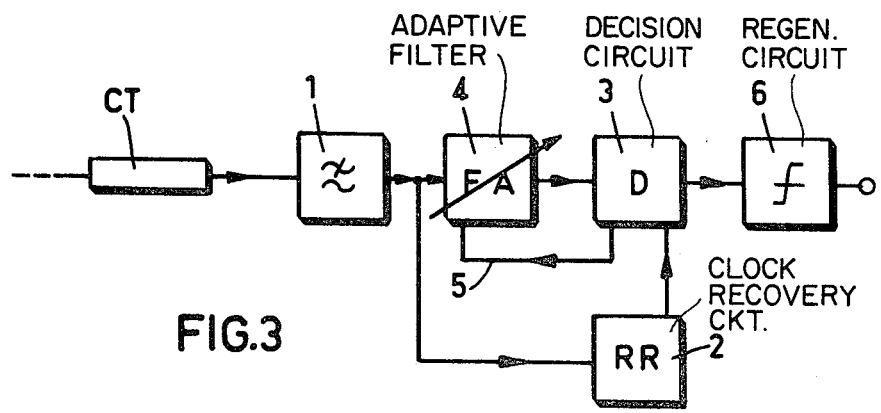

Two embodiments of a phase recovering circuit for use of this method will now be described. Referring to FIG. 2 and FIG. 3, it will be stated precisely that, irrespective of the structure of the embodiment employed for the circuit of the invention, said circuit can be inserted into adaptive as well as non-adaptive digital data receiving systems.

FIG. 2 represents schematically a system having a non-adaptive structure and successively shows at the output of a transmission channel CT:

a lowpass filter 1;

a clock recovery circuit 2;

a decision circuit 3 arranged in parallel with this circuit 2, so that it also receives the output signal from the lowpass filter 1 and in addition the output signal from the clock recovery circuit 2 for the clock control of said decision circuit 3.

A system with adaptive structure as shown in FIG. 3 comprises, in addition to the elements of the system shown in FIG. 2, an adaptive filter 4 arranged between the output of the lowpass filter 1 (and consequently the input of the clock recovery circuit 2) and the input of the decision circuit 3. Adapting said adaptive filter 4 is effected through a feedback connection 5 deriving an error signal from the output of the decision circuit 3. Finally, irrespective of the fact whether it is adaptive or not, the system may comprise a regeneration circuit 6 connected to the output of the decision circuit 3 and pivoting the definite shaping of the output signals of the receiving system.

Figure 4:
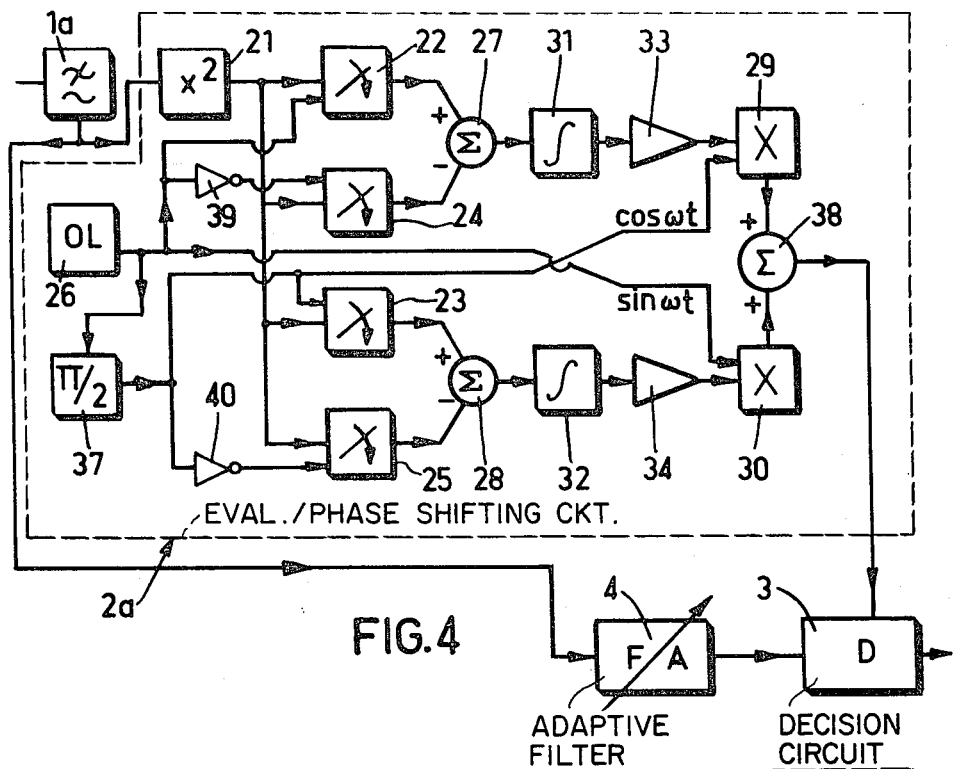
FIG. 4 and FIG. 5 show two embodiments of the phase recovering circuit in accordance with the invention.

The first embodiment of the phase recovery circuit in accordance with the invention will be described with reference to FIG. 4, and comprises therefore a lowpass filter circuit 1a followed by an evaluation and phase shifting circuit 2a. In the foregoing it has already been mentioned that this filter circuit 1a is a lowpass filter which eliminates the frequencies above 1/T from the received spectrum or renders these frequencies negligibly small, and whose insertion makes it possible to dispose of an output signal whose average energy has a sinusoidal variation $(A+B \cdot \cos \phi$ or $A+B \cdot \sin \phi)$ at the output of said filter circuit 1a. For the entire following description it is assumed that, by way of non-limitative example, the time reference has been selected such that this average energy as a function of the time t and the period T is defined by the expression:

$$E = A + B \cdot \sin(2\pi t/T) \tag{10}$$

where A and B are two positive real coefficients which are constant or vary slowly, if the channel and its transfer function vary with time.

The evaluation and phase shifting circuit 2a itself comprises the elements 21 through 40. First, a squaring circuit 21 receives the output signal from the filter circuit 1a and produces a signal which is proportional to the average energy of this output signal. Four sampling circuits 22, 23, 24 and 25 each receive the output signal of this squaring circuit 21. Their sampling instants $\tau_1$, $\tau_2$, $\tau_3$, $\tau_4$ are fixed by a local oscillator 26 and are regularly spaced by distances of T/4 so that the following relations hold:

$$\begin{aligned}
E_{\tau 1} &= A + B \cdot \sin(2\pi\tau_1/T) & (11) \\
&= A + B \cdot \sin\phi & (11\text{ bis}) \\
E_{\tau 2} &= A + B \cdot \sin[2\pi(\tau_1 + T/4)/T] & (12) \\
&= A + B \cdot \cos\phi & (12\text{ bis}) \\
E_{\tau 3} &= A + B \cdot \sin[2\pi(\tau_1 + T/2)/T] & (13) \\
&= A - B \cdot \sin\phi & (13\text{ bis}) \\
E_{\tau 4} &= A + B \cdot \sin[2\pi(\tau_1 + 3T/4)/T] & (14) \\
&= A - B \cos\phi & (14\text{ bis})
\end{aligned}$$

By combining the relations (11)–(14) (or 11 bis–14 bis), it is now possible to determine the phase deviation $\phi_E$ defined in the second step of the method in accordance with the invention. A first summing circuit 27 receives at a first, positive input thereof the output signal from the sampling circuit 22 and at a second, negative input thereof the output signal from the sampling circuit 24; likewise, a second summing circuit 28 receives at a first, positive input thereof the output signal from the sampling circuit 23 and at a second, negative input thereof the output signal from the sampling circuit 25. Two multipliers 29 and 30 receive at first inputs thereof, respectively output signals from the first summing circuit 27, through a series arrangement of an integrator 31 and an amplifier 33, and from the second summing circuit 28, through a series arrangement of an integrator 32 and an amplifier 34.

The oscillator 26 fixes the sampling instant $\tau_1$ of the first sampling circuit 22 (direct output of the oscillator) and, by means of a 90° phase shifter 37, the sampling instant $\tau_2$ of the second sampling circuit 23. The output signals of the oscillator 26 and the phase shifter 37 are also applied, respectively, to the second inputs of the second multiplier 30 and the first multiplier 29. These output signals are further applied, respectively, to two inverter circuits 39 and 40, whose input signals fix the sampling instants $\tau_3$ and $\tau_4$ of the sampling circuits 24 and 25, respectively. An adder 38 receives the output signal from the first multiplier 29 (if $\omega$ is the frequency of the oscillator 26 and sin $\omega t$ its output signal at the direct output, this output signal of the first multiplier is proportional to the product sin $\phi \cdot \cos \omega t$) and the output signal of the second multiplier 30 (proportional to cos $\phi \cdot \sin \omega t$) and produces an output signal which in accordance with the known trigonometrical adding formula is proportional to sin $(\omega t + \phi)$ and which is applied to the clock input of the decision circuit 3; this terminates the control of the phase of the clock thus obtained.

The phase recovery circuit just described is suitable for moderately rapid digital data receiving systems. For the case of rapid systems the problem of sampling becomes critical and the sampling circuits are preferably replaced by delay lines.

Figure 5:
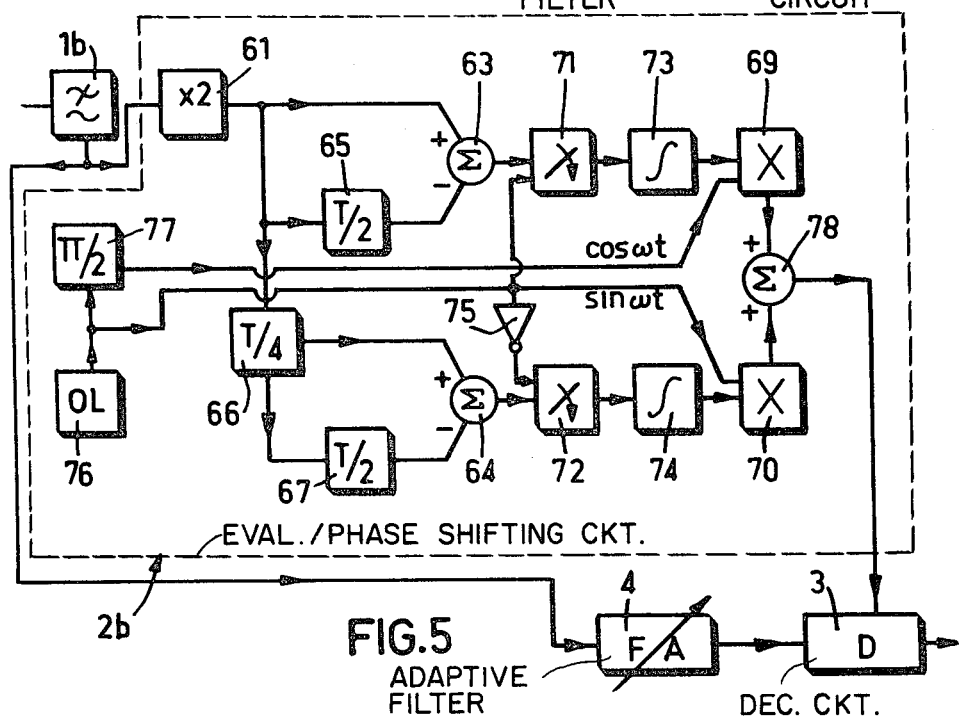

So, the second embodiment of the phase recovery circuit arranged for high speeds and described with reference to FIG. 5 comprises a filter circuit 1b, which is identical to the circuit 1a, and an evaluation and phase shifting circuit 2b, which is formed by the elements 61 through 78 and has the following structure. As in the foregoing, four parallel paths are provided between the output of a squaring circuit 61 and two summing circuits 63 and 64. The first summing circuit 63 receives at a first, positive input thereof the output signal from the squaring circuit 61 and at a second, negative input thereof this same output signal through a delay line 65 having a time delay equal to T/2. The second summing circuit 64 receives at a first, positive input thereof the output signal from the squaring circuit 61 through a delay line 66 having a time delay equal to T/4 and at a second, negative input thereof the output signal from the delay line 66 through a further delay line 67 having a time delay equal to T/2 (the approximate delay of the signal arriving at this second, negative input of the summing circuit 64 is thus equal to 3T/4).

Two multipliers 69 and 70 receive at first inputs thereof the respective signals from the first summing circuit 63, through a series arrangement of a sampling circuit 71 and an integrator 73, and from the second summing circuit 64, also through a series arrangement of a sampling circuit 72 and an integrator 74. A local oscillator 76 fixes the sampling instant of the sampling circuit 71 and, by means of an inverter circuit 75, the sampling instant of the sampling circuit 72. Finally, the output signal of the oscillator 76 (applied to the first sampling circuit 71) and the output signal of a 90° phase shifter 77 connected to the output of the oscillator are applied to the second input of the second multiplier 70, whose output signal is proportional to sin $\omega t \cdot \cos \phi$, and to the second input of the first multiplier 69, whose output signal is proportional to cos $\omega t \cdot \sin \phi$, respectively, an adder 78 receiving the output signal from each of these multipliers 69, 70 produces an output signal which is proportional to sin $(\omega t + \phi)$ and which is applied to the clock input of the decision circuit 3.

It will be obvious that the present invention is not limited to the above-described and proposed embodiments, but that variants are possible without departing from the scope of the invention. Such a variant may consist in the provision of a phase recovery circuit which may have a different number of n parallel paths, instead of four paths, this circuit then enabling the resolution of a system of also said different number of trigonometrical equations; if, for example, the case where n=3 is considered, the circuit comprises only three parallel paths which include the first, second and third sampling circuits, respectively, whose sampling instants are spaced by T/3.

If the transmission is carried out at a comparatively low speed, it is even possible to provide only one single sampling circuit followed by a switch for connecting this sampling circuit sequentially to each of the n parallel paths in the rhythm of the clock which fixes the sampling instants. In the embodiment described in the foregoing, where n=4, sampling may be performed only at instants spaced by 5T/4—instead of sampling at instants regularly spaced by T/4—thereby nevertheless obtaining the same system of four trigonometrical equations which can be solved in a particular simple way.

What is claimed is:

1. In a receiving system for digital data having a symbol period T and being transmitted after linear modulation over a time-varying channel with limited pass-band, said system comprising a filter circuit for the output signal of the channel and a subsequent decision circuit for effectuating an estimation and a reconstruction of each of the tramsmitted digital data at the input of the channel on the basis of the output signal of the filter circuit and in the rhythm of a clock which is associated with this decision circuit and whose frequency and phase are determined by a clock recovery circuit permitting a decision which minimizes the error rate, a method for controlling the phase of said clock of the decision circuit, characterized in that the method comprises the following steps:
   imposing on the filter circuit a transfer function such that this circuit substantially eliminates the frequencies above 1/T from the received frequency spectrum and the average energy E of its output signal as a function of the time t and of the symbol period T of the transmitted data at the input of the channel is only defined by an expression of the type $E=A+B \cos(\pi t/T)$, A and B being two constant or slowly varying positive real coefficients;
   estimating the phase deviation $\phi_E$ between the value $\phi_M = 2\pi t_M/T$ maximizing the expression for E and the value $\phi = 2\pi t/T$ corresponding to the value of the average energy of the output signal of the filter circuit at a sampling instant t preceding the clock phase control;
   shifting the sampling instants fixed by the clock over time $t_E = (\phi - \phi_M)T/(2\pi)$, taking its sign into consideration.

2. A phase recovery circuit for a receiving system for digital data having a symbol period T and being transmitted after linear modulation over a time-varying channel with limited pass-band, characterized in that the phase recovery circuit comprises:
   a lowpass filter circuit having a transfer function such that this circuit substantially eliminates the frequencies above 1/T from the received frequency spectrum and the average energy of its output signal, as a function of the time t and the symbol period T of the transmitted data at the input of the channel, is only defined by an expression of the type $E=A+B \cdot \cos(2\pi t/T)$, A and B being two constant or slowly varying positive real coefficients;
   an evaluation circuit for determining the phase deviation $\phi_E$ between the value $\phi_M = 2\pi t_M/T$ maximizing the expression for E and the value $\phi = 2\pi t/T$ corresponding to the value of the average energy of the output signal of the filter circuit at a sampling instant t preceding the clock phase control; and
   a phase shifting circuit for shifting the sampling instants fixed by the clock over a time $t_E = (\phi - \phi_M)T/(2\pi)$, taking its sign into consideration.

3. A phase recovery circuit as claimed in claim 2, characterized in that the evaluation and phase shifting circuit comprises:
   a squaring circuit receiving the output signal of the lowpass filter circuit;
   first, second, third and fourth parallel-arranged sampling circuits, each receiving the output signal of the squaring circuit and their samping instants being spaced by T/4;
   first and second summing circuits receiving at first, respective, positive inputs the respective output signals of the first and the second sampling circuits and at second respective, negative inputs the respective output signals of the third and fourth sampling circuits;
   first and second multipliers receiving at first respective inputs the receiving output signals of the first and the second summing circuits, each through a series arrangement of an integrator and an amplifier;
   a local oscillator which fixes the sampling instant of the first sampling circuit and, by means of a 90° phase shifter, the sampling instant of the second sampling circuit, said oscillator and phase shifter output signals also being applied to the second respective inputs of the second and the first multiplier, respectively, and being further applied to the third and fourth sampling circuits, respectively, through two inverter circuits; and
   an adder receiving the output signals of the first and the second multipliers, the output signal of this adder being applied as the clock to the decision circuit.

4. A phase recovery circuit as claimed in claim 2, characterized in that the evaluation and phase shifting circuit comprises:
   a squaring circuit receiving the output signal of the lowpass filter circuit;
   a first summing circuit receiving at a first, positive input the output signal of the lowpass filter circuit and at a second, negative input this same output signal through a delay line having a time delay equal to T/2, and a second summing circuit receiving at a first, positive input the output signal of the lowpass filter circuit through a delay line having a time delay equal to T/4 and at a second, negative input this same output signal through a delay line having a time delay 3T)4;
   first and second multipliers receiving at a first input the respective output signals of the first and the second summing circuits, each through a series arrangement of a sampling circuit and an integrator, the sampling instant of the first and the second sampling circuits being spaced by T/2;
   a local oscillator which fixes the sampling instant of the first sampling circuit and, by means of an inverter circuit, the sampling instant of the second sampling circuit;
   a 90° phase shifter for the output signal of the oscillator, the output signal of this phase shifter and the output signal of the oscillator applied to the first sampling circuit being applied to the second input of the first multiplier and the second multiplier, respectively;

an adder receiving the output signal of the first and second multipliers, the output signal of this adder being applied as the clock to the decision circuit.

5. A receiving system for digital data which, after linear modulation, are transmitted over a time-varying channel with limited passband, this system comprising a filter circuit for the output signal of the channel and a subsequent decision circuit for effectuating an estimation and a reconstruction of each of the trasmitted digital data at the input of the channel on the basis of the output signal from the filter circuit and in the rhythm of a clock which is associated with this decision circuit and whose frequency and phase are determined by a clock recovery circuit permitting a decision which minimizes the error rate, characterized in that the clock recovery circuit of this system comprises a phase recovery circuit as claimed in any one of the claims 2 to 4, inclusive.

* * * * *